US012604918B2

(12) United States Patent
Howie et al.

(10) Patent No.: US 12,604,918 B2
(45) **Date of Patent: *Apr. 21, 2026**

(54) SYNERGISTIC COMPOSITIONS

(71) Applicant: Lintbells Limited, Weston (GB)

(72) Inventors: John Howie, Weston (GB); Glenn Vile, Weston (GB)

(73) Assignee: Lintbells Limited, Hitchin (GB)

( * ) Notice: Subject to any disclaimer, the term of this patent is extended or adjusted under 35 U.S.C. 154(b) by 670 days.

This patent is subject to a terminal disclaimer.

(21) Appl. No.: 17/793,949

(22) PCT Filed: Jan. 13, 2021

(86) PCT No.: PCT/GB2021/050074
§ 371 (c)(1),
(2) Date: Jul. 20, 2022

(87) PCT Pub. No.: WO2021/148777
PCT Pub. Date: Jul. 29, 2021

(65) Prior Publication Data
US 2023/0068175 A1      Mar. 2, 2023

Related U.S. Application Data

(63) Continuation-in-part of application No. 16/748,580, filed on Jan. 21, 2020, now Pat. No. 11,690,878.

(30) Foreign Application Priority Data

Jan. 21, 2020   (GB) ..................................... 2000879

(51) Int. Cl.
A23L 17/50         (2016.01)
A23D 9/00          (2006.01)
(Continued)

(52) U.S. Cl.
CPC ................ A23L 17/50 (2016.08); A23D 9/00 (2013.01); A23K 10/22 (2016.05); A23K 20/158 (2016.05);
(Continued)

(58) Field of Classification Search
CPC . A23D 9/00; A23L 33/10; A23L 17/30; A23L 17/40; A23L 17/00; A23L 17/50;
(Continued)

(56) References Cited

U.S. PATENT DOCUMENTS

| | | |
|---|---|---|
| 10,278,995 B1 | 5/2019 | Van Kampen et al. |
| 2006/0039992 A1 | 2/2006 | Miller et al. |
| 2021/0220409 A1 | 7/2021 | Howie et al. |

FOREIGN PATENT DOCUMENTS

| | | |
|---|---|---|
| AU | 2019100451 A4 | 5/2019 |
| CN | 109984251 A | 7/2019 |

(Continued)

OTHER PUBLICATIONS

Ancient Nutrition, 'Ancient Omegas Joint Support' Omega-3 supplement by Ancient Nutrition. Retrieved online at: https://ancientnutrition.com/search?view=spring&q=ancient+omegas+joint+support. 2 pages, 2010-2022.

(Continued)

*Primary Examiner* — Subbalakshmi Prakash
(74) *Attorney, Agent, or Firm* — McCarter & English, LLP

(57)        ABSTRACT

The invention concerns novel compositions, comprising at least 2 different sources of ω-3 fatty acids, including wherein hoki roe at 5% (w/w) in powder or oil form and green-lipped mussel in powder or oil form. The compositions are particularly useful as/in supplements and/or animal or human food stuffs. The invention may further relate to the maintenance or treatment of human and veterinary conditions, such (Continued)

as use in the improvement of inflammation or joint related disorders that maybe associated with inflammation.

7 Claims, 5 Drawing Sheets

(51) Int. Cl.

| | |
|---|---|
| *A23K 10/22* | (2016.01) |
| *A23K 20/158* | (2016.01) |
| *A23L 17/30* | (2016.01) |
| *A23L 33/12* | (2016.01) |

(52) U.S. Cl.
CPC .............. *A23L 17/30* (2016.08); *A23L 33/12* (2016.08); *A23V 2002/00* (2013.01)

(58) Field of Classification Search
CPC ........ A23L 33/105; A23L 17/10; A23L 33/12; A23K 20/158; A23K 10/22; A61K 35/60; A61K 35/618; A61K 2300/00; A61K 9/0053; A61P 29/00; A23V 2002/00; C11B 3/006
USPC ............................................................ 426/2
See application file for complete search history.

(56) References Cited

FOREIGN PATENT DOCUMENTS

| | | | |
|---|---|---|---|
| EP | 1146870 | A1 | 10/2001 |
| EP | 1378243 | A1 | 1/2004 |
| JP | 2008-056598 | A | 3/2008 |
| WO | WO-1997/09992 | A1 | 3/1997 |
| WO | WO-1998/07326 | A1 | 2/1998 |
| WO | WO-2000/56164 | A1 | 9/2000 |
| WO | WO-2004/075653 | A1 | 9/2004 |
| WO | WO-2006/004438 | A1 | 1/2006 |
| WO | WO-2008/153426 | A1 | 12/2008 |

OTHER PUBLICATIONS

Bah et al., Physicochemical Properties and Bioactivity of Extracts from the Roe of New Zealand Hoki and Southern Blue Whiting. Journal of Aquatic Food Products Technology. 2016;25(8):1234-1248.

Bettjeman et al., Seafood Phospholipids: Extraction Efficiency and Phosphorous Nuclear Magnetic Resonance Spectroscopy (31P NMR) Profiles. J Am Oil Chem Soc. Jul. 2, 2018;95(7):779-786.

Bligh et al., A rapid method of total lipid extraction and purification. Can J Biochem Physiol. Aug. 1959;37(8):911-7.

Brien et al., Systematic review of the nutritional supplement *Perna canaliculus* (green-lipped mussel) in the treatment of osteoarthritis. QJM. Mar. 2008;101(3):167-79.

Cobb et al., Systematic review of a marine nutriceutical supplement in clinical trials for arthritis: the effectiveness of the New Zealand green-lipped mussel *Perna canaliculus*. Clin Rheumatol. May 2006;25(3):275-84.

Coulson et al., *Perna canaliculus* (Green-Lipped Mussel): Bioactive Components and Therapeutic Evaluation for Chronic Health Conditions. Progress in Drug Research, vol. 70, Novel Natural Products: Therapeutic Effects in Pain, Arthritis and Gastro-intestinal Diseases. K.D. Rainsford (Ed.), Springer, Basel. pp. 91-132, (2015).

James et al., Dietary n-3 fatty acids and therapy for rheumatoid arthritis. Semin Arthritis Rheum. Oct. 1997;27(2):85-97.

Maroon et al., Omega-3 fatty acids (fish oil) as an anti-inflammatory: an alternative to nonsteroidal anti-inflammatory drugs for discogenic pain. Surg Neurol. Apr. 2006;65(4):326-31.

Miller et al., Regiospecific Analyses of Triacylglycerols of Hoki (*Macruronus novaezelandiae*) and Greenshell™ Mussel (*Perna canaliculus*). Journal of the American Oil Chemists' Society. 2011;88:509-516.

Tallarida et al., Quantitative methods for assessing drug synergism. Genes Cancer. Nov. 2011;2(11):1003-8.

International Search Report and Written Opinion for Application No. PCT/GB2021/050074, dated Apr. 13, 2021, 10 pages.

U.S. Appl. No. 16/748,580, filed Jan. 21, 2020, 2021-0220409, Published.

SYNERGISTIC COMPOSITIONS

CROSS REFERENCE TO RELATED APPLICATIONS

This application is a U.S. National Stage Application filed under 35 U.S.C. § 371, based on International Patent Application No. PCT/GB2021/050074, filed on Jan. 13, 2021, which claims foreign priority to GB Patent Application No. 2000879.3, filed on Jan. 21, 2020. PCT/GB2021/050074 is also a continuation-in-part application of U.S. patent application Ser. No. 16/748,580, filed on Jan. 21, 2020. The entire contents of each of the above-referenced applications are incorporated herein by reference.

The invention concerns novel compositions comprising a combination of two different blended marine-sourced components comprising at least two components including at least hoki roe (HR) powder or oil and preferably in combination with green-lipped mussel (GLM) powder or oil.

The invention further extends to the use of that composition in human and veterinary applications, particularly in supplements or nutraceuticals thereby providing nutritional support in health and in particular in joint health.

BACKGROUND

Nutraceuticals, food and health supplements are often utilised to improve or support joint structure and maintain joint mobility in mammals, including humans and animals.

The biological inflammatory pathway is directly linked with joint health including, for example, joint mobility. Potentially, lipids including pro-resolving lipid mediators, and bioactive peptides may also have a role, but may act via different pathways.

An effect has been shown to be derived from essential fatty acids (EFAs). Several enzymes implicated in the biological inflammatory pathway are thought to be impacted by the presence or absence of these EFAs and is also dependent of the type of EFA.

A significant level of omega ($\omega$) polyunsaturated fatty acids, particularly $\omega$-3, is likely to support the body's natural anti-inflammatory process and may therefore be useful. In particular, these EFAs are metabolised into anti-inflammatory eicosanoids. The presence of $\omega$-3 bolsters the existing anti-inflammatory pathway because they will be preferentially acted upon in the process, but in their absence the natural substrate, including other EFAs such as arachidonic acid, would metabolise to generate pro-inflammatory agents.

Although GLM powder can be utilised for the purpose of providing a $\omega$-3 source within supplement compositions, the quality and content of the $\omega$-3 fatty acid is not always reliable and may not always be sufficient for products intended for maintaining joint health in humans or animals.

However, it remains desirable to provide effective compositions for use in supporting joint health, whether as a long term maintenance product, e.g. in food stuffs or nutritional supplements, or as a short term dietary solution. In particular, the ability to provide high specification sources of GLM powders that correlate with a desired technical specification that is sufficient to meet these applications is increasingly challenging.

The invention therefore comes about from the continued need to provide new compositions that are useful in the aforementioned commercial applications.

SUMMARY OF INVENTION

The invention concerns a composition comprising a combination of two powder or oil components including: a green-lipped mussel (GLM) powder or oil component; and at least 5% (w/w) of a hoki roe (HR) powder or oil component.

The invention also concerns a composition comprising: a blend of at least two different powder or oil components each comprising $\omega$-3 fatty acids, wherein a first of the at least two different powder or oil components comprises 5% (w/w) or more of HR powder or oil and wherein the blend of the at least two different powder or oil components together provides at least 3.3% (w/w) total $\omega$-3 fatty acids in the composition. Preferably, a second of the at least two powder components is GLM powder or oil.

In the first instance, the applicant made the observation that when providing a composition for the before-described application, the selection of the $\omega$-3 fatty acid source is very important. The $\omega$-3 fatty acids in any given powder source on the market varies considerably. The applicant's preliminary investigations confirmed that some GLM powder specifications did not provide enough $\omega$-3 to meet the technical criteria for the intended purpose, as compared to a higher specification product which is rare and less easily available to the market.

However, GLM remains an important base source of $\omega$-3 fatty acids, even when low and the inventors further investigated other ways in which GLM-based compositions would nonetheless provide a solution. In doing so it was determined that including a minimum amount of a different, specifically selected, $\omega$-3 fatty acid source, in combination with the lower specification GLM powder, raised the $\omega$-3 content to an acceptable level. It was elucidated through testing that using at least 5% of HR powder, blended with the lower specification GLM powder achieved this solution.

It was further elucidated through in vitro assay testing that an unexpected, enhanced level of inhibitory or modulatory activity can be observed in a composition by introducing a particular selection or combining sources of $\omega$-3 content. Such activity is highly relevant to supporting the inflammatory response pathway and maintaining optimum joint health. The anti-inflammatory activity of a blend of HR powder and GLM powder is preferably measured as a co-efficient of between 0.05 and 0.25, determined according to the methods described herein below.

The applicant was further able to demonstrate that, provided the source remained the same, the HR component and/or the GLM component could be used in oil form to yield a composition with an equivalent technical effect, thereby providing an additional solution to the problem based on the fundamental inventive concept.

During similar assays, as were undertaken for the powder components, the effect of this specific two-oil component combination on the inflammatory pathway is greater than would be expected from the sum of the individual component parts.

The combination of these two components, whether powder or oil form, is therefore better at inhibiting or modulating levels of inflammation, as measured by the relative COX 2 activity, than would be predicted from the level disclosed in the art. In other words, the applicant has demonstrated there is a synergistic effect which is useful to maintain a better level of support for the anti-inflammatory system when the component combination is selected from either the powder or oil form.

The in-vitro inhibition or modulation activity observed by the applicant is considered to be far greater than the mere additive effect that would be expected from the $\omega$-3 EFA levels combination alone. Therefore, the applicant has determined a most unexpected synergistic effect can be achieved by the invention. That is, the specific introduction of HR at a de minimus level and/or further a specific selection of this powder or oil component with a lower specification GLM extract maintains a higher level of competitive enzyme activity than would be expected based purely on $\omega$-3 EFA content. In embodiments, the invention therefore concerns a food product, supplement or nutraceutical comprising the composition having the components as recited in the claims and as described herein.

Such a composition would meet or exceed the technical criteria required, in terms of content and/or activity and thus enable consistent and improved efficacy of a GLM-based product for the purpose of supporting joint health. The invention is useful in the provisions of a food stuff or supplement comprising the composition as described herein. The food stuff or supplement may further comprise one or more useful excipients desirable to make the supplement more palatable, or may provide other benefits. The excipient may include one or more of the following excipients including, but not limited to: Glucosamine, Hyaluronic Acid and Chondroitin Sulphate.

In preferred embodiments of either aspect of the invention the HR powder or oil is in the range from 5% to 95% (w/w) of the total composition mass. In embodiments, the HR powder or oil component comprises a total fat content of 14% to 40% (w/w) but importantly may comprise a total $\omega$-3 fatty acid content from 2% to 20% (w/w).

As regards the GLM content, the GLM powder or oil comprises a total fat content from 7% to 13% (w/w). It is envisaged that in embodiments the GLM powder or oil comprises a total $\omega$-3 fatty acid content in the range of 2.0% to 7.0% (w/w) ideally 2.0% to 5.0% (w/w).

The compositions of the invention are particularly useful as a supplement for humans or a veterinary product and may be used to prevent inflammation, to maintain low levels of inflammation and/or to treat inflammation. The composition itself and/or food stuff or supplement comprising that composition, may be for use in the treatment and/or maintenance of health, preferably joint health of a human or animal. Further, the treatment and/or maintenance involves support of anti-inflammatory pathways in the human or animal.

The invention further extends to a method of maintaining joint health comprising administering to an animal in need thereof the composition disclosed herein. In embodiments, the maintenance of health involves supporting anti-inflammatory pathways of the animal including the prevention of inflammation.

The invention extends to a method of treating a subject, the method comprising administering to the subject the composition as disclosed herein, wherein the subject is a human or an animal. In embodiments the method treats inflammation or maintains low levels of inflammation in the subject, wherein the subject is an animal. In embodiments, the method maintains health or joint health of the subject.

BRIEF DESCRIPTION

DETAILED DESCRIPTION

GLM is used to provide EFAs into the body. They support the anti-inflammatory process by being preferentially acted upon in the anti-inflammatory system, resulting in anti-inflammatory mediators.

In the absence of these $\omega$-3 EFAs, other EFAs, notably arachidonic acid, will be used as substrates, resulting in pro-inflammatory mediators.

Figure 1:
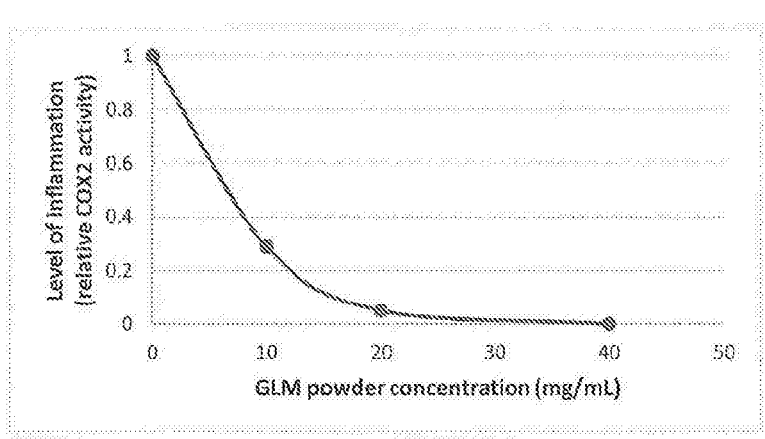
FIG. 1 is a graph illustrating a dose response curve for gold standard specification of GLM.

A dose response is seen in effect depending upon the quantity of GLM used, i.e. as the concentration is increased, the activity of an inflammatory process (COX2 activity) drops away—see FIG. 1.

Figure 2:
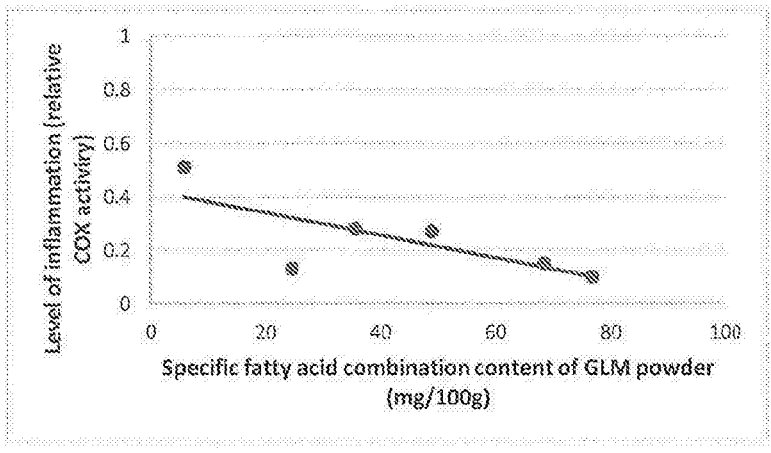
FIG. 2 is a graph illustrating the varying GLM quality sample work.

The inventors have identified that when GLM is utilised at the same concentration but crucially has a lower EFA specification, a decreased effect on an inflammatory process is seen—see FIG. 2.

Figure 3:
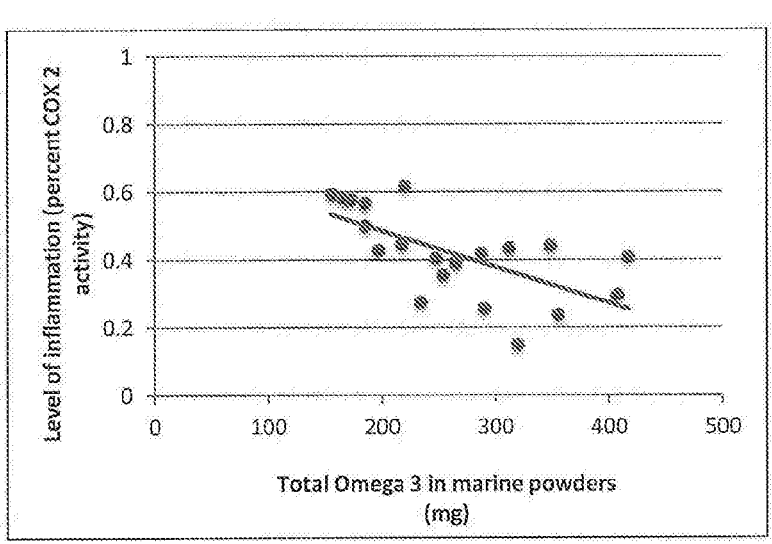
FIG. 3 is a graph illustrating the $\omega$-3/COX2 ratio data.

Further the inventors have identified a correlation between $\omega$-3 EFAs and activity of an inflammatory process i.e. with increasing $\omega$-3 EFAs, activity of an inflammatory process decreases-see FIG. 3.

Figure 4:
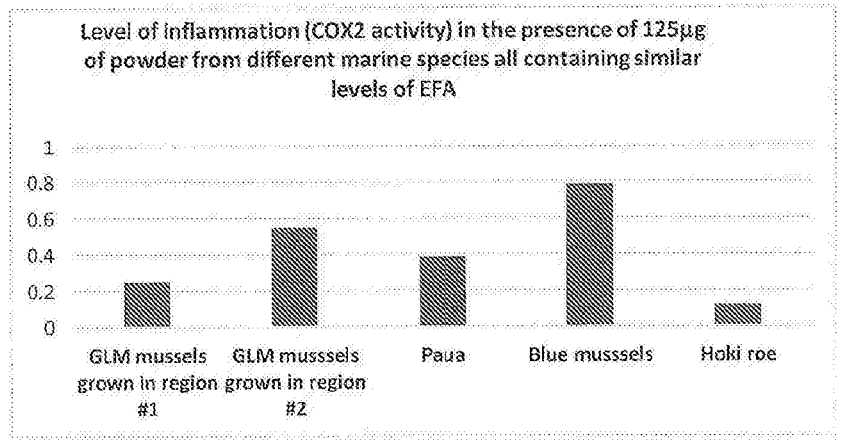
FIG. 4 is a graph illustrating marine sample screening work comparing GLM, Paua, Blue mussels and HR.

It has further been identified that certain marine species are more effective at decreasing levels of an inflammatory process, despite having similar levels of total EFA, suggesting the bioactivity is connected to particular EFAs, as compared to all tested—see FIG. 4.

HR has been identified as one source that appears to have higher profiles of certain EFAs that is similar to GLM in some EFAs. The potential to utilise HR as a replacement/top up for reduced EFA spec GLM and reduced concentration of full spec GLM was therefore further investigated.

Figure 5:
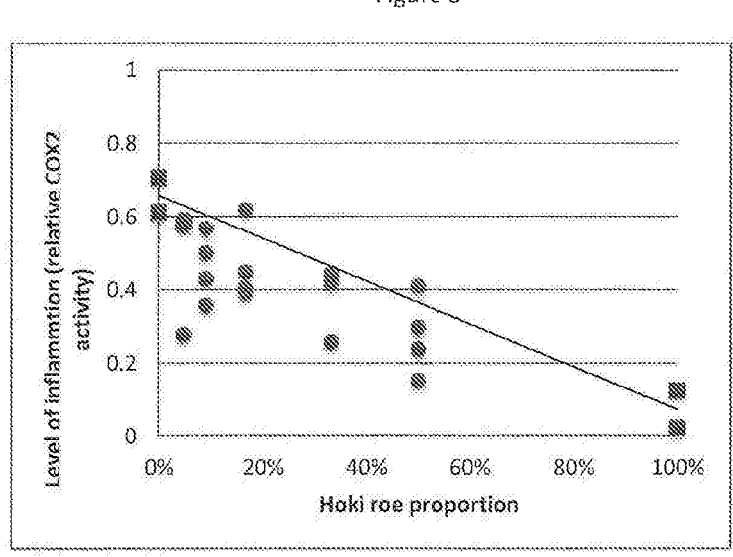
FIG. 5 is a graph illustrating the effects at specific % combinations showing the predicted effect on inflammatory processes and the actual effect.

Based on the relative effects of GLM and HR on an inflammatory process, a number of combinations were tested of reduced concentration GLM/HR added or reduced EFA GLM/HR added. The expected additive effect was calculated based on the inflammatory performance of the original GLM & HR samples, with the aim to maintain the effect expected from a full concentration, full spec GLM—see FIG. 5.

In fact, what the inventors identified is a greater effect on the inflammatory processes in the combination than would be expected from sum of the individual component parts. The invention demonstrates a clear synergistic effect that can be used to maintain a better level of support for the anti-inflammatory system.

EFAs are thought to be important as a component in any composition which is intended to help support natural anti-inflammatory processes related to human or animal joints, as described here before.

In particular ω-3 EFAs appear to act as dual competitors of arachidonic acid oxygenation by both the cyclooxygenase (COX) and lipoxygenase (LOX) pathway and thus are useful in said applications.

EFA and ω-3 fatty acids particularly can be found in the green-lipped mussel (GLM) or green shell mussel (GSM; *Perna canaliculus*). As described previously, alternatives or additives were sought for investigation due to the variation in the specification of GLM powders and the fact that alone, many existing powder sources of GLM did not necessarily provide a specification with a sufficient content of ω-3 fatty acids.

A variety of marine sources were reviewed as potential sources of desirable ω-3 fatty acid components. Generally marine-derived high ω-3 fatty acid sources are oils from shellfish or fish organs.

A range of these types of oils were screened as potential substitutes for part of a composition comprising GLM in order to improve the total ω-3 fatty acid content. While being good sources of ω-3 fatty acids per se it was found that it was difficult to blend the oils with the GLM powder to provide a homogenous powder suitable for formulation into applicable products.

However, one such source of ω-3 fatty acids was the dried roe powder from *Macruronus novaezelandiae*, or the white fish hoki. Thus Hoki Roe (HR) powder was tested to determine whether its addition to the GLM powder would improve the content of the EFA, particularly the ω-3 fatty acids.

The suitability of HR powder was determined by measuring the levels of the ω-3 fatty acids in the GLM powder before addition of HR powder, then after addition, to examine if the ω-3 levels were elevated to the required specification by the combination. The required specification was provided by a GLM powder known to give a commercially desired therapeutic outcome, with a comparatively high ω-3 fatty acid specification.

To ensure that the novel blend of powders also exhibited desired anti-inflammatory activity (despite the inclusion of lower ω-3 content GLM) in vitro enzyme activity was tested and compared to a standard desirable specification product, as used by the applicants.

A commonly used in vitro process of measuring of anti-inflammatory activity was used, namely by determining the level of in vitro competition of the COX2 enzyme, which is known to be a pathway involved significantly in the inflammation process, discussed herein before.

Methods

New Zealand green lipped mussel (GLM) powder and New Zealand HR powder were obtained from commercial sources and lipid extracts were obtained from the individual powders, or blends of the powders, using the Bligh and Dyer method. This method is described in the following published reference concerning the same (Bligh and Dyer, A rapid method of total lipid extraction and purification. Canadian Journal of Biochemistry and Physiology 1959, 37: 911-917). The fatty acid components of the lipid extracts were measured using AOAC method 963.22.

Results

A first set of data was generated by measuring and comparing the amount of ω-3 fatty acids in a standard reference source of GLM product (X) known by the applicant to have an acceptable specification and thus the required amount of ω-3 fatty acid suitable and desirable for use. A further source of GLM powder (x) known to be of a lower specification was also measured.

The GLM x powder, alone, presented insufficiently, measuring at significantly less ω-3 fatty acid than the reference powder GLM (X) with low COX2 activity or modulation and was thus below the required specification required for the commercially desirable applications mentioned herein before.

A new combination was tested to determine how ω-3 fatty acid levels were impacted when the below spec product x was supplemented with an amount of a different powder known to be rich in ω-3.

HR powder (H) had previously been selected from a variety of sources, on the basis that it had good potential for elevating the total ω-3 fatty acid content and is able to be easily blended into the GLM powder.

In order to establish if a lower specification GLM powder could be raised to the required specification by addition of HR powder it was theoretically determined that at least 5% (w/w), preferably 8% (w/w) of a specific HR powder (BN: HR114) added to a lower specification GLM powder (x) would raise the total ω-3 content score (the measure of % fatty acid in the total fat of the product) to a level that meets the required specification.

It was determined by measurement that by including 8% (w/w) HR powder (H) into a blend with the below specification GLM powder (x), the ω-3 fatty acid content was increased to 3.5% (w/w), very close to the level shown for the standard powder X (BN32132) as in the Table 1:

TABLE 1

| Composition | Batch number | GLM powder component (g) | HR powder component (g) | Total ω-3 score (g/100 g) |
|---|---|---|---|---|
| GLM powder— below specification (x) | | 100 | 0 | 3.1 |
| HR powder (H) | BN:HR114 | 0 | 100 | 5.1 |
| GLM powder— below specification plus HR (x + H) | | 95 | 5 | 3.3 |
| GLM powder— below specification plus HR (x + H) | BN32127 | 92 | 8 | 3.5 |
| GLM powder— commercially | BN32132 | 100 | 0 | 3.6 |

TABLE 1-continued

| Composition | Batch number | GLM powder component (g) | HR powder component (g) | Total ω-3 score (g/100 g) |
|---|---|---|---|---|
| acceptable specification (X) | | | | |

Biological Activity and Graphic Analysis

Different quality specifications of GLM (that varied in the levels of ω-3 fatty acids) were combined with HR powder in different ratios. We then measured total ω-3 fatty acids in the combination product and the COX inhibitory or modulating scores of those powders compared to the source GLM (x) and Hoki powders (H).

Next, anti-inflammatory activity of the above examples was measured to determine the likely potential for biological impact of the combination as compared to the expected activity based on the new combinations of sourced ω-3 fatty acids.

The COX2 inhibition or modulation was determined by incubating lipid extracts of the powder blend combinations with commercially available mammalian COX2 enzyme and the enzyme's activity was measured as the co-oxidation of N,N,N',N'-tetramethyl-p-phenylenediamine (TMPD) by prostaglandin G2 (PGG2) to produce oxidised TMPD, which is blue in colour and readily detectable at 611 nm.

The COX2 inhibitory or modulatory activity of the powder blend combinations was determined from the lipid extract concentration-dependent inhibition or modulation of the COX2 enzyme, or by the anti-inflammatory activity (AI) score of the powder sample, calculated as the inverse of the concentration of lipid extract required to inhibit or modulate the COX2 enzyme by 50% ($IC_{50}$) multiplied by the total weight of lipid extracted from the powder blend combinations.

As can be seen from the Figures, it was determined that concentration-dependent inhibition or modulation of COX2 by the below specification GLM powder (x) blended with 8% (w/w) HR powder (H) to produce x+H (BN32127) powder was significantly greater than a GLM powder X (BN 32132) alone, which had displayed a similar ω-3 fatty acid level (as was shown in Table 1) and thus would have been assumed to be similar.

Figure 6:
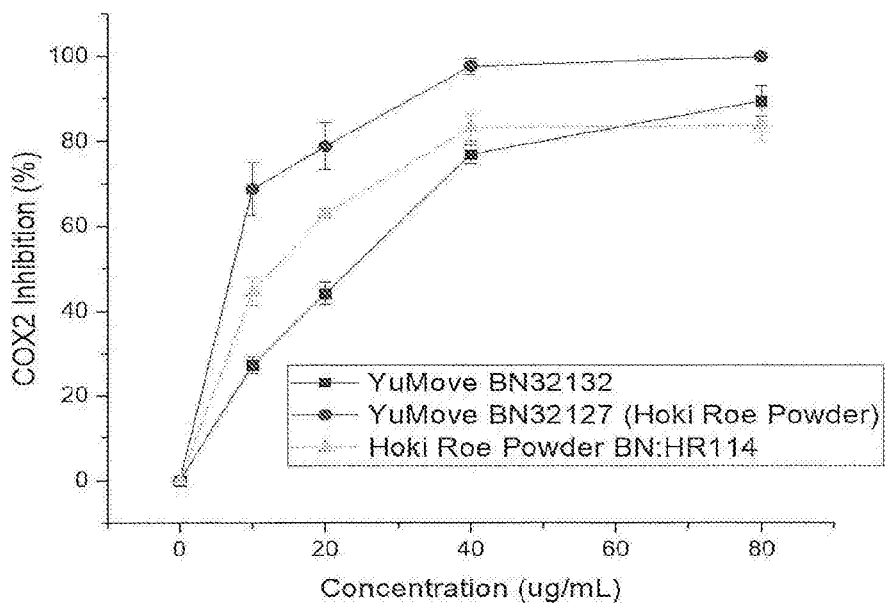
FIG. 6 is a graph illustrating the concentration-dependent inhibition or modulation of COX2 of the 3 different sampled powders.

Rather surprisingly, as shown in FIG. 6 specifically, the concentration-dependent inhibition or modulation of COX2 by x+H (BN 32127) was even greater than a 100% HR powder H (BN:HR114), which exhibited an ω-3 level that was significantly greater than x+H (as shown in Table 1).

Figure 7:
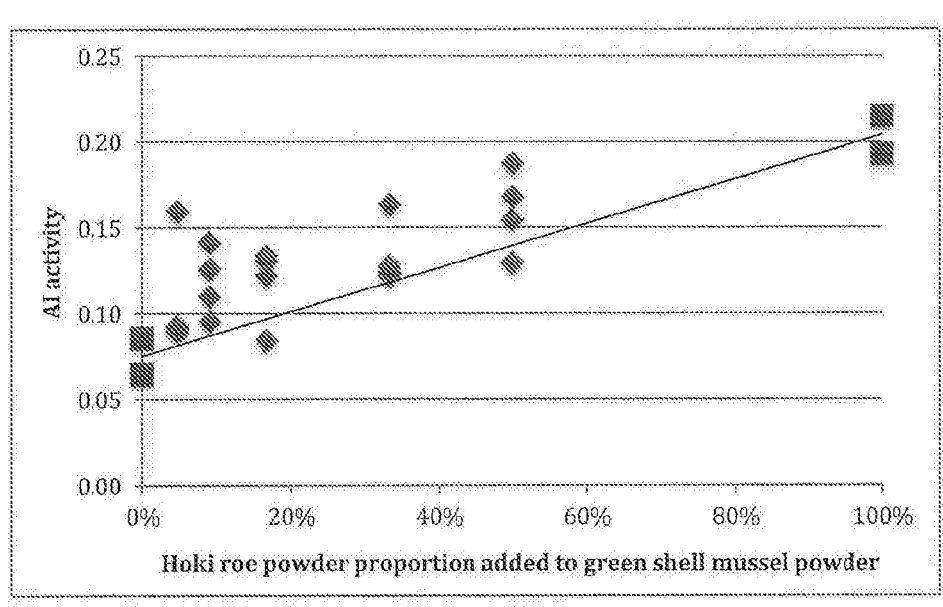
FIG. 7 is a graph illustrating anti-inflammatory activity exhibited vs % powder blend and compared with the H powder and X powder expected trend line.

As can be seen in FIG. 7, it was further established that anti-inflammatory (AI) activity exhibited by x+H at various percentage of % H blend (diamond data points) was greater than would be expected from the (AI) activity one would expect when plotting a linear trend line showing activity of the GLM powder X (far left square data points) and HR powder H alone (far right square data points). The linear trend line between the two indicates what might be expected from a simple additive effect of the two powders suggesting the two have an enhanced effect that in combination goes far beyond the addition of the individual effect.

Figure 8:
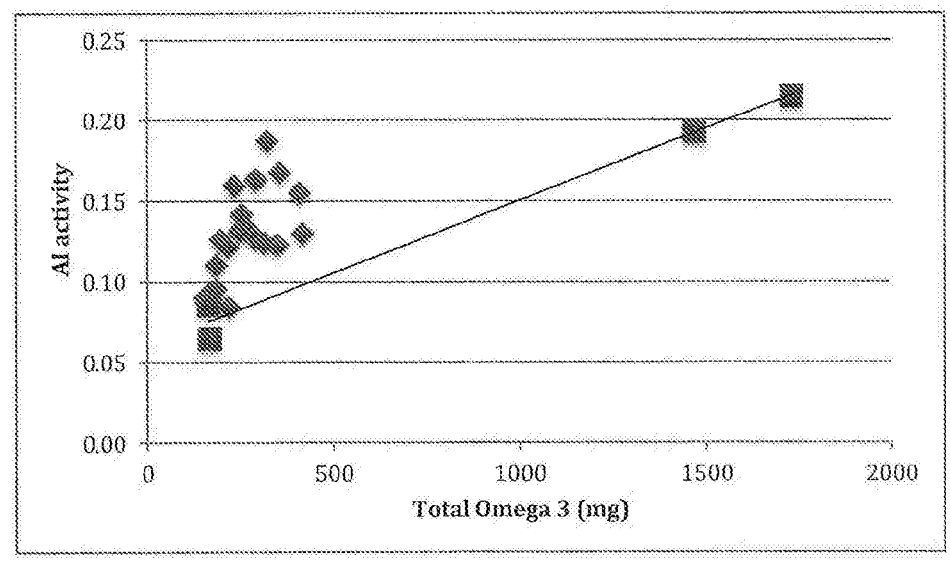
FIG. 8 is a graph illustrating the anti-inflammatory activity of x+H blends as compared to the levels of total $\omega$-3 fatty acids as compared to H powder and X powder expected trend line.

This trend was further observed in FIG. 8, since the anti-inflammatory (AI) activity of x+H at various % powder blends (diamond data points) was also greater than would be expected from: the levels of total Omega-3 fatty acids in the H and X alone (as was shown in FIG. 3).

The large square data points display the linear trend line relationship indicating what would be expected from a simple additive effect achieved by combining the two powders. However, as can be seen, the blended powder exceeded the expected AI activity quite significantly, indicating the novel combination provides for an enhanced and thus synergistic effect, rather than a mere accumulative or additive effect.

The inventors have additionally tested oil-based combinations of these components and established that anti-inflammatory activity exhibited at various percentage of H blend (circle data points) was also greater than would be expected from the additive activity of the oil components. This confirmed that oil based component combination was also effective in producing an enhanced bioactivity as compared to the individual components.

Table 2 shows the results of the oil-based component testing below:

| HR oil | GLM oil | Level of inflammation (COX2 $IC_{50}$ μg/mL) |
|---|---|---|
| 0.0% | 100.0% | 28.50 |
| 100.0% | 0.0% | 51.50 |
| 5.0% | 95.0% | 22.80 |
| 10.0% | 90.0% | 25.90 |
| 25.0% | 75.0% | 23.50 |
| 50.0% | 50.0% | 41.60 |
| 75.0% | 25.0% | 29.70 |
| 90.0% | 10.0% | 32.40 |
| 95.0% | 5.0% | 40.80 |

Figure 9:
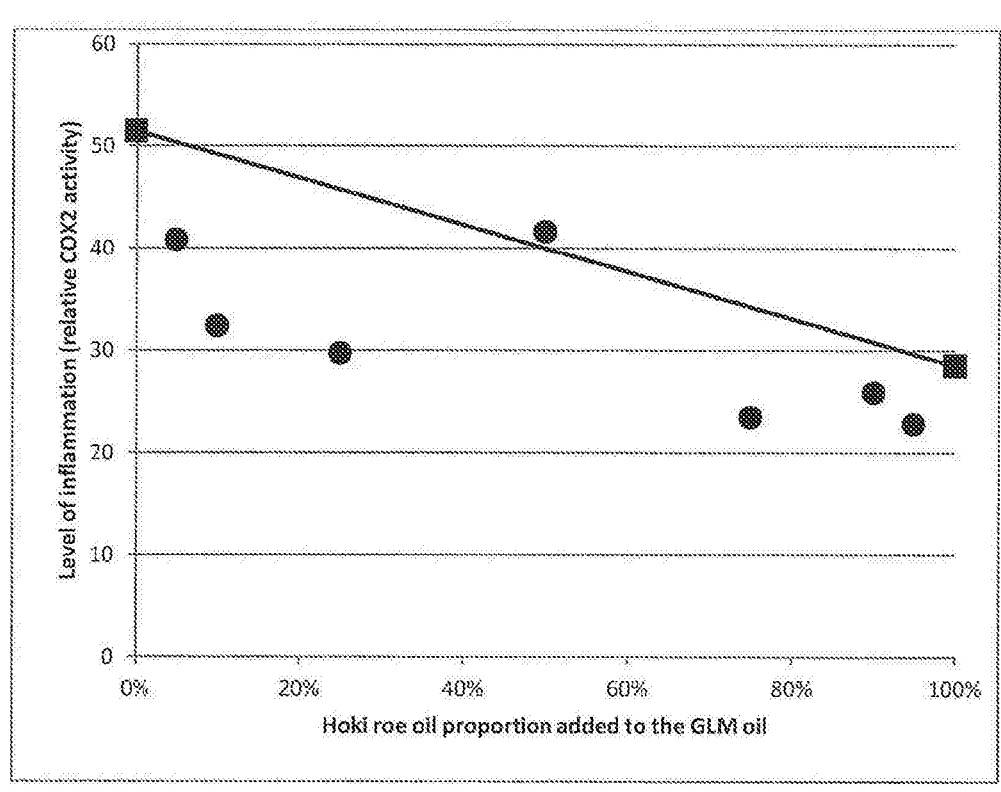
FIG. 9 is a graph illustrating the combination of these two components in oil form (at various blend percentages) is more effective at modulating COX2 activity than would be expected from the trend line.

FIG. 9 illustrates the significance of these results (shown in Table 2) in graphical form by plotting the relative COX2 activity one might expect from the 100% GLM oil (far left square) and 100% HR oil (far right square) when either is used alone. The linear trend line between the two plotted data square points indicates what might be expected from a simple additive effect of the two oils.

The plotted results from the actual activity observed in various combinations as also found in Table 2 above (plotted as circle data points) suggest the oil component combination also has an enhanced synergistic effect that goes beyond the additive effect of the individual oil components.

The invention claimed is:

1. A composition comprising a blend of two different oil components, the blend consisting of:
   a green-lipped mussel (GLM) oil; and
   at least 5% (w/w) of a Hoki Roe (HR) oil,
   wherein the composition synergistically inhibits COX2 activity.

2. The composition of claim 1, wherein the two different oil components together provides at least 3.3% total ω-3 fatty acids in the composition.

3. The composition of claim 1, wherein the HR oil is present in a range from 5% to 95% (w/w) of the total composition.

4. The composition of claim 1, wherein the GLM oil comprises a total ω-3 fatty acid content in a range of 2.0% to 5.0% (w/w).

5. The composition of claim 1, wherein the HR oil comprises a total ω-3 fatty acid content from 2% to 20% (w/w).

6. A food stuff, nutraceutical or supplement comprising the composition of claim 1.

7. The food stuff, nutraceutical or supplement of claim 6, further comprising one or more excipients selected from Glucosamine and/or Hyaluronic Acid.

* * * * *